United States Patent
Kriel et al.

(10) Patent No.: US 9,431,876 B2
(45) Date of Patent: Aug. 30, 2016

(54) PORTABLE FLUID DRIVEN GENERATOR FOR INSTRUMENT USE IN HAZARDOUS ENVIRONMENTS

(71) Applicant: SGS North America Inc., Rutherford, NJ (US)

(72) Inventors: Wayne A. Kriel, Friendswood, TX (US); Alex R. Lynn, Tomball, TX (US)

(73) Assignee: SGS North America Inc., Rutherford, NJ (US)

( * ) Notice: Subject to any disclaimer, the term of this patent is extended or adjusted under 35 U.S.C. 154(b) by 168 days.

(21) Appl. No.: 14/446,884

(22) Filed: Jul. 30, 2014

(65) Prior Publication Data

US 2016/0036295 A1    Feb. 4, 2016

(51) Int. Cl.
| | | |
|---|---|---|
| F03B 15/02 | (2006.01) | |
| H02K 5/136 | (2006.01) | |
| H02K 7/18 | (2006.01) | |

(52) U.S. Cl.
CPC ............ *H02K 7/1823* (2013.01); *H02K 5/136* (2013.01)

(58) Field of Classification Search
CPC ..... G01D 11/00; H02K 5/136; H02K 7/1823
See application file for complete search history.

(56) References Cited

U.S. PATENT DOCUMENTS

| | | | | |
|---|---|---|---|---|
| 5,080,289 A * | 1/1992 | Lunzer | ................. | B05B 5/0532 239/690 |
| 5,218,305 A * | 6/1993 | Lunzer | ................. | B05B 12/004 239/690 |
| 6,379,023 B1 * | 4/2002 | Passno | ................. | B60Q 1/2657 362/192 |
| 6,506,176 B1 * | 1/2003 | Mittelstein | ............... | A61F 9/013 604/107 |
| 6,522,039 B1 | 2/2003 | Baltz et al. | | |
| 2002/0043409 A1 * | 4/2002 | Parkert | ................. | B60K 25/04 180/53.4 |
| 2005/0217275 A1 * | 10/2005 | Hendrickson | ............ | A62B 9/00 60/775 |
| 2008/0129051 A1 * | 6/2008 | Saucier | ................... | F01D 1/34 290/52 |
| 2008/0252078 A1 * | 10/2008 | Myers | ................... | F01D 15/10 290/52 |
| 2009/0224077 A1 * | 9/2009 | Altenburger | .......... | B05B 5/0531 239/526 |
| 2009/0266069 A1 * | 10/2009 | Domes | ................... | B60K 6/12 60/409 |
| 2012/0086204 A1 * | 4/2012 | Re | .......................... | F03B 13/00 290/43 |
| 2015/0300997 A1 | 10/2015 | Kriel et al. | | |

FOREIGN PATENT DOCUMENTS

| | | | | |
|---|---|---|---|---|
| DE | 3533750 C1 * | 3/1987 | ............... | F21S 9/04 |
| JP | 62185531 A * | 8/1987 | | |
| JP | S62185531 A | 8/1987 | | |

OTHER PUBLICATIONS

Zanichelli, International Search Report and Written Opinion for International application No. PCT/US2015/042669, Nov. 18, 2015, 12 pages.

ATEX Turbolite, Zones: 1, 2, 21 and 22, Wolf Safety Lamp Company, product information, Version: SL001, Issue 2, retrieved Jul. 29, 2014 from http://www.wolf-safety.co.uk/temporary-lighting/airlamps/atex-turbolite, 3 pages.

* cited by examiner

*Primary Examiner* — Tulsidas C Patel
*Assistant Examiner* — S. Mikailoff
(74) *Attorney, Agent, or Firm* — Fish & Richardson P.C.

(57) ABSTRACT

An apparatus for facilitating use of instruments in hazardous environments includes a fluid line and a fluid-driven generator. The fluid line includes: an inlet to receive a flow of fluid from a fluid source; a first outlet to convey a first portion of the fluid flow to an instrument as a purge gas; and a second outlet to convey a second portion of the fluid flow. The fluid-driven generator is coupled to the second outlet of the fluid line, and converts fluid-stored energy in the second portion of the fluid flow to electrical energy deliverable to the instrument as the second portion of the fluid flow is received from the second outlet.

17 Claims, 4 Drawing Sheets

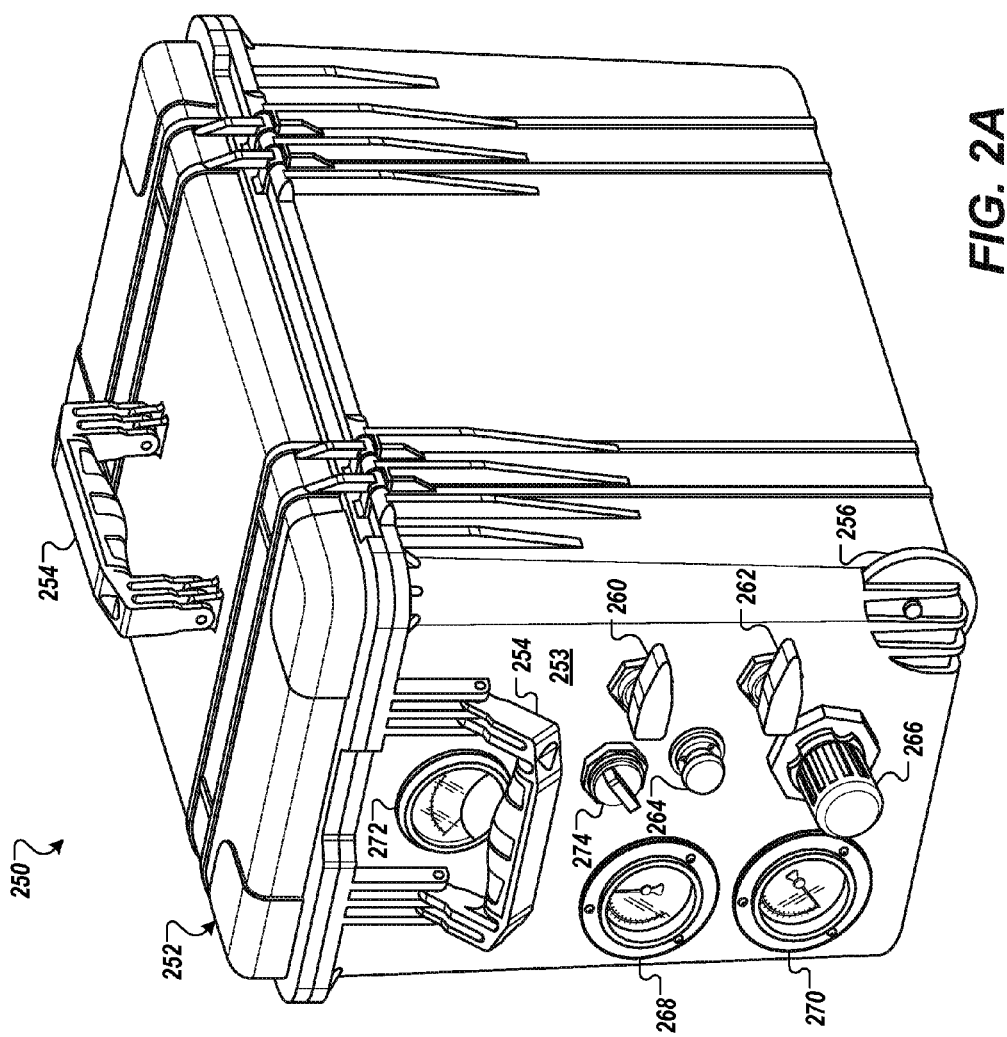

PORTABLE FLUID DRIVEN GENERATOR FOR INSTRUMENT USE IN HAZARDOUS ENVIRONMENTS

TECHNICAL FIELD

The present disclosure relates to systems, apparatus, and methods for facilitating use of instruments in hazardous environments.

BACKGROUND

A wide range of industrial work sites present hazardous environments in which various instruments requiring electrical power must be used. Electrical instrumentation used in a hazardous environment, however, has the potential of igniting explosive or flammable materials in the air. Thus, various protection techniques have been developed to mitigate the risk of such ignitions. For example, the electrical instrumentation can be rendered explosion proof, dust ignition proof, dust tight, purged/pressurized, intrinsically safe, and/or hermetically sealed. In addition to the instrumentation itself, the power supply serving the instrumentation must be designed for safe use in hazardous environments.

SUMMARY

Systems, apparatus, and methods of the present disclosure benefit from a recognition that to facilitate use of instruments in hazardous environments, fluid required by such instruments for purging and/or other purposes can also be used to simultaneously satisfy their respective power demands. In so doing, an efficient power supply suitable for use in hazardous environments is provided by eliminating the need for battery packs or electrical outlets. For example, in some implementations, a single fluid source can be used to provide both purge gas to the instrument and drive gas to a generator powering the instrument.

In a first general aspect an apparatus for facilitating use of instruments in hazardous environments includes a fluid line and a fluid-driven generator. The fluid line includes: an inlet to receive a flow of fluid from a fluid source; a first outlet to convey a first portion of the fluid flow to an instrument as a purge gas; and a second outlet to convey a second portion of the fluid flow. The fluid-driven generator is coupled to the second outlet of the fluid line, and converts fluid-stored energy in the second portion of the fluid flow to electrical energy deliverable to the instrument as the second portion of the fluid flow is received from the second outlet.

Implementations of the first general aspect may include one or more of the following features:

In some cases, the fluid-driven generator includes a fluid-driven turbo-alternator. The flow of fluid may include a flow of compressed gas. The first outlet of the fluid line can be coupled to a purge gas inlet of the instrument. The instrument may include a portable device for use in hazardous environments. The apparatus may further include a portable housing carrying the fluid line and the fluid-driven generator. The apparatus may further include: a first pressure regulator to control the first portion of the fluid flow; and a second pressure regulator to control the second portion of the fluid flow.

In some cases, the apparatus may further include a power conditioner coupling the fluid-driven generator to the instrument. The power conditioner may include a rectifier to transform an alternating current flow of electricity provided by the fluid-driven generator to a direct current flow of electricity. The power conditioner may further include a converter electrically connected to the rectifier to regulate a voltage of the direct current flow of electricity to a predetermined voltage. The power conditioner may further include at least one of a surge dampening device and an isolation switch electrically connected to the converter.

In a second general aspect a method of facilitating use of instruments in hazardous environments includes the operations of: providing a flow of fluid to a fluid line; conveying, through a first outlet of the fluid line, a first portion of the fluid flow to an instrument as a purge gas; conveying, through a second outlet of the fluid line, a second portion of the fluid flow to a fluid-driven generator; converting fluid-stored energy in the second portion of the fluid flow to a flow of electrical energy with the fluid-driven generator; and delivering the flow of electrical energy to the instrument.

Implementations of the second general aspect may include one or more of the following features.

In some cases, providing the flow of fluid includes providing at least a sufficient amount of fluid to satisfy a purge gas demand of the instrument and a power demand of the instrument. The method may further include regulating a flow rate of the first portion of the fluid flow based on the purge gas demand of the instrument. The method may still further include regulating a flow rate of the second portion of the fluid flow based on the power demand of the instrument. The method may further include transporting a housing carrying the fluid line and the fluid-driven generator to a hazardous environment. Providing the flow of fluid may include providing a flow of compressed gas. The instrument may include a portable device for use in hazardous environments.

In some cases, the method further includes conditioning the flow of electrical energy prior to delivering the flow of electrical energy to the instrument. Conditioning the flow of electrical energy may include transforming an alternating current flow of electricity provided by the fluid-driven generator to a direct current flow of electricity. Conditioning electrical energy may further include regulating a voltage of the direct current flow of electricity to deliver electrical energy to the instrument at a predetermined voltage.

In a third general aspect a system includes a gas line, a portable device, and a fluid-driven turbo-alternator. The gas line includes an inlet coupled to a gas source. The portable device is coupled to receive a first flow of gas from the gas source through a first outlet of the gas line, and is configured for use in a hazardous environment. The fluid-driven turbo-alternator is coupled to receive a second flow of gas from the gas source through a second outlet of the gas line, and converts gas-stored energy in the second flow of gas to electrical energy to be delivered to the portable device as the second flow of gas is received through the second outlet.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 2A-2C are perspective, rear and front views of an apparatus for facilitating use of instruments in hazardous environments.

DETAILED DESCRIPTION

The present disclosure relates to systems, apparatus, and methods for facilitating use of instruments in "hazardous environments." While various existing standards and regulations provide detailed specifications and classification systems for identifying and categorizing hazardous environments, the present disclosure is not so limited. In context of the present disclosure, hazardous environments include any locations made hazardous by the presence of any presently known or unknown flammable or combustible materials (e.g., alcohols, ethers, gasoline, natural gas, hydrocarbons, coal, sulphur, plastics, wood and certain metals). Such materials, in the form of gases, vapors, mists, dusts and/or fibers, can form ignitable or explosive atmospheres when mixed at certain concentration levels with air. Thus, hazardous environments may include, but are not limited to, oil and natural gas drilling sites, mining sites, petroleum refineries, utility gas plants, manufacturing plants, recycling facilities, and the like.

Figure 1:
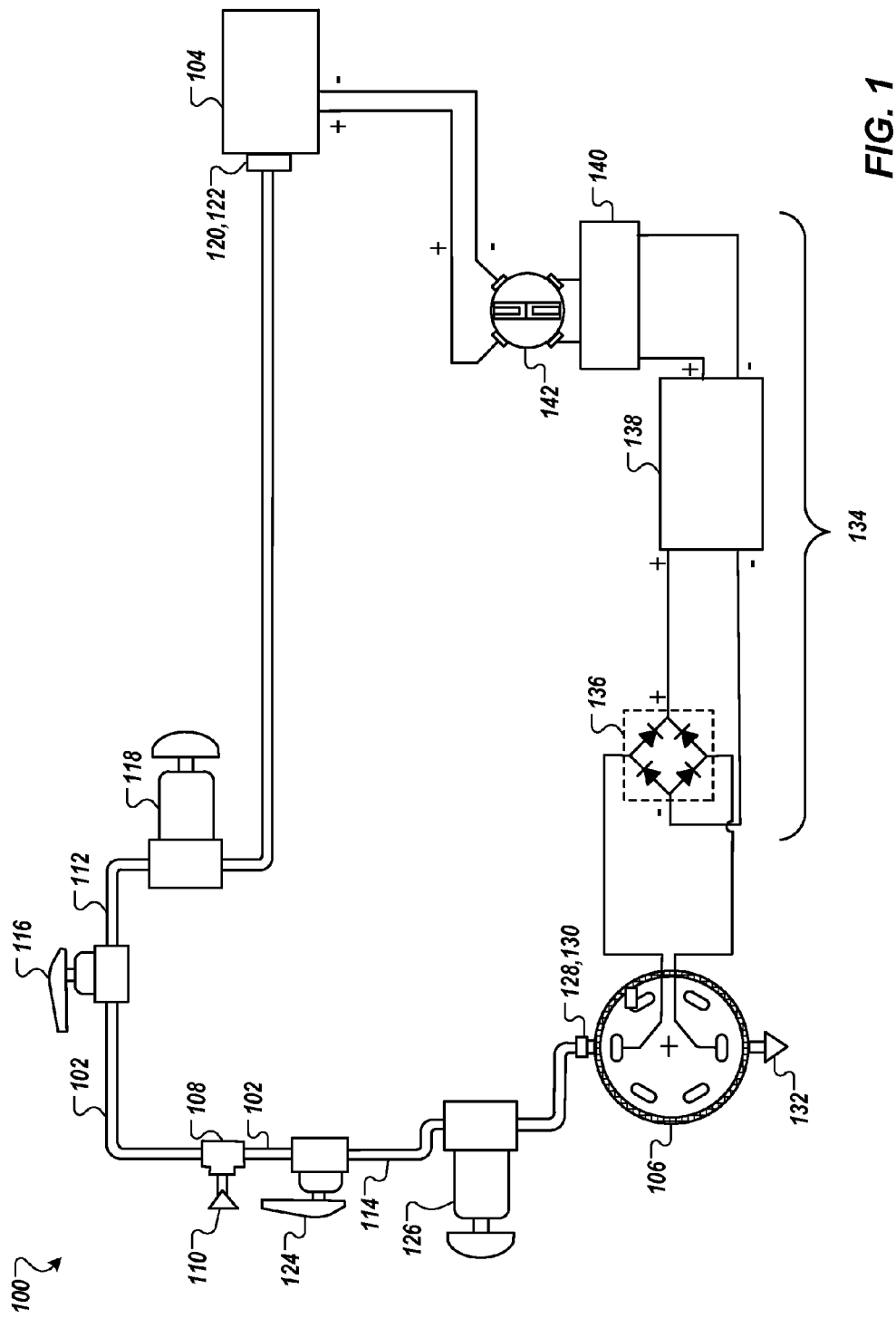
FIG. 1 is a diagram of a system for use in hazardous environments.

FIG. 1 is a diagram of a system 100 suitable for use in hazardous environments. System 100 includes a fluid line 102, an instrument 104, and a fluid-driven generator 106. The fluid line 102 is suitable for conveying pressurized fluid throughout the system 100. Thus, the fluid line 102 may be designed or configured differently depending on the application of the system 100. For example, in various applications of the system 100, the fluid line 102 can be a substantially rigid or flexible conduit formed from a metallic or polymeric material. In various applications, the fluid line 102 is sized to achieve specified fluid flow characteristics, e.g., flow rate and pressure. In a particular example, the fluid line is provided in the form of a tubular conduit having a three-eighths inch diameter.

The fluid line 102 includes an inlet 108 fluidically coupled to a fluid source 110 (e.g., via a quick coupling) that provides a pressurized flow of fluid to the system 100. The fluid source 110 may be provided in the form of a storage container (e.g., a cartridge or tank) or a central line continuously delivering fluid directly from a reservoir, a conditioning station, or a compressor. In some implementations, the fluid provided by the fluid source 110 is a noncombustible fluid. In some implementations, the fluid includes compressed gas suitable for serving as a purge gas for the instrument 104 (e.g., clean dry air or inert gas such as nitrogen). In some implementations, the compressed gas provided by the fluid source 110 can be conditioned by one or more components along the fluid line 102 to provide a suitable purge gas composition. As shown, the inlet 108 includes a branch-line fitting that creates two branches of the fluid line 102 downstream of the fluid source 110. The first branch 112 of the fluid line 102 conveys a first portion of the fluid flow to the instrument 104 as purge gas. The second branch 114 of the fluid line 102 conveys a second portion of the fluid flow to the fluid-driven generator 106.

The first fluid-line branch 112 includes a stop valve 116 and a pressure regulator 118 that control the first portion of the fluid flow independent of the second portion. The pressure regulator 118 is located downstream of the stop valve 116. The stop valve 116 is adjustable between an open- and closed-position. While in the open-position, the stop valve 116 allows fluid from the fluid source 110 to pass substantially uninterrupted through the valve. While in the closed-position, the stop valve 116 prevents further downstream fluid flow. The stop valve 116 may be used to facilitate installation of one or more components of the system 100. For example, the stop valve 116 may be adjusted to the closed-position while the first fluid-line branch 112 is coupled to the fluid source 110 and/or the instrument 104.

The pressure regulator 118 controls the first portion of the fluid flow by reducing the supply pressure of fluid from the fluid source 110 to match a lower pressure setpoint. The pressure setpoint corresponds to a purge gas demand of the instrument 104. The purge gas demand relates to the amount of purge gas flow that is required by the instrument 104 to operate properly. In a particular example, the purge gas demand of the instrument is between about forty and eighty cubic feet per hour. In some applications, the purge gas demand, and therefore the corresponding pressure setpoint, may vary over time. Thus, the pressure regulator 118 may be manually, mechanically or electronically controlled to satisfy multiple pressure set points.

An outlet 120 of the first fluid-line branch 112 is fluidically coupled to a purge gas inlet 122 of the instrument 104. The instrument 104 may be any type of electrical or mechanical tool, apparatus or device that requires a flow of purge gas to operate properly in a hazardous environment. In some implementations of the system 100, the instrument 104 is an analytical instrument designed to provide information on the composition of matter. For example, an analytical instrument for analyzing hydrocarbon-containing fluids may be incorporated into the system 100. Such an analytical instrument, as described in co-pending U.S. patent application Ser. No. 14/258,976 (the entirety of which is incorporated herein by reference), may include an analysis system for assessing the condensate-gas ratio for a hydrocarbon-containing fluid via cyclonic separation. The cyclone separator of the analytical instrument is located in a housing maintained at positive pressure by purge gas such that the atmosphere in the housing does not permeate the enclosure and such that potentially explosive atmosphere in the ambient air is inhibited from entering the housing. Thus, the above-described analytical instrument may be operable in hazardous environments. In some implementations, the instrument 104 is a portable device that can be installed and replaced as a modular component of the system 100.

As noted above, the second branch 114 of the fluid line 102 conveys a second portion of the fluid flow from the fluid source 110 to the fluid-driven generator 106. Similar to the first fluid-line branch 112, the second fluid-line branch 114 includes a stop valve 124 and a pressure regulator 126 that control the second portion of the fluid flow independent of the first portion. The stop valve 124 and pressure regulator 126 may be substantially similar to the stop valve 116 and pressure regulator 118. The pressure regulator 126, however, controls the second portion of the fluid flow by reducing the supply pressure of fluid from the fluid source 110 to match a pressure setpoint corresponding to a power demand of the instrument 104. The power demand relates to the amount of fluid flow that is required by the fluid-driven generator 106 to generate sufficient power to energize the instrument 104. In a particular example, the power demand of the instrument is between about eighteen to twenty cubic feet per minute; and the corresponding pressure set point is between about eighteen and twenty-two pounds per square inch. In some applications, the power demand, and therefore the corresponding pressure setpoint, may vary over time. Thus, the pressure regulator 126 may be manually, mechanically or electronically controlled to satisfy multiple pressure set points.

An outlet 128 of the second fluid-line branch 114 is fluidically coupled to a fluid inlet of 130 of the fluid-driven generator 106. The fluid-driven generator 106 may be any type of apparatus, device, or system operable to convert energy stored in flowing fluid into a flow of electrical energy (electrical power). Electrical power produced by the fluid-driven generator 106 can be alternating-current (AC) or direct-current (DC) power. In some implementations of the system 100, the fluid-driven generator 106 is a turbo-alternator including a turbine wheel mechanically coupled to an electrical alternator including a permanent magnet rotor and a stator. In such implementations, fluid conveyed to the fluid-driven generator 106 from the fluid source 110 by the second fluid-line branch 114 drives the turbine wheel which, in turn, drives the rotor of the electrical alternator to produce AC power. In some implementations, the turbo-alternator is a compact, high-speed alternator with the rotor directly connected to the shaft of the turbine wheel. Exhaust fluid is discharged from the fluid-driven generator 106 through an exhaust vent 132. In some implementations, the exhaust vent 132 includes a diffuser to diffuse (e.g., slow down) the exhaust fluid as the fluid flows from the fluid-driven generator 106.

A power conditioner 134 electrically couples the fluid-driven generator 106 to the instrument 104. The power conditioner 134 includes various electrically-connected components that cooperate to "condition" the raw electrical power produced by the fluid-driven generator 106 to meet with the specifications of the instrument 104. In the illustrated example, the power conditioner 134 includes a rectifier 136, a converter 138, a surge compensator 140, and an isolation switch 142. The rectifier 136 transforms AC power from the fluid-driven generator 106 into DC power. In a particular example, output from the fluid-driven generator of 24-30 VAC at 240 Watts is transformed by the rectifier to 24-30 VDC. The converter 138 is a DC-to-DC converter that adjusts, by increasing or decreasing, the output voltage from the rectifier 136 to meet a specified voltage of the instrument 104. In a particular example, the 24-30 VDC output of the rectifier is stepped down to a constant 12 VDC at 200 Watts. The surge compensator 140 is a dampening device provided to protect the integrity of the converter 138 against high inrush currents drawn at startup of the instrument 104. The isolation switch 142 is used to break the electrical connection between the instrument 104 and the power conditioner 134 and the fluid-driven generator 106. When the instrument 104 is isolated by the isolation switch 142, it can be safely removed from the system 100 and potentially replaced without winding down the fluid-driven generator 106.

Although several components of the power conditioner have been shown and described, it is contemplated that, in some implementations of the system, the instrument may be designed to directly receive electrical power from the fluid-driven generator, without conditioning. Further, it is contemplated that, in various implementations of the system, a different configuration of power-conditioning components may be required to accommodate the instrument. Further still, while the illustrated power-conditioning components are depicted as standalone parts of the system, one or more of these components may be integrated into the fluid-driven generator or the instrument. For example, the rectifier can be provided in the form of an end plate of the turbo-alternator. Such modifications from the illustrated example are considered to be within the scope of the present disclosure.

Figure 2C:
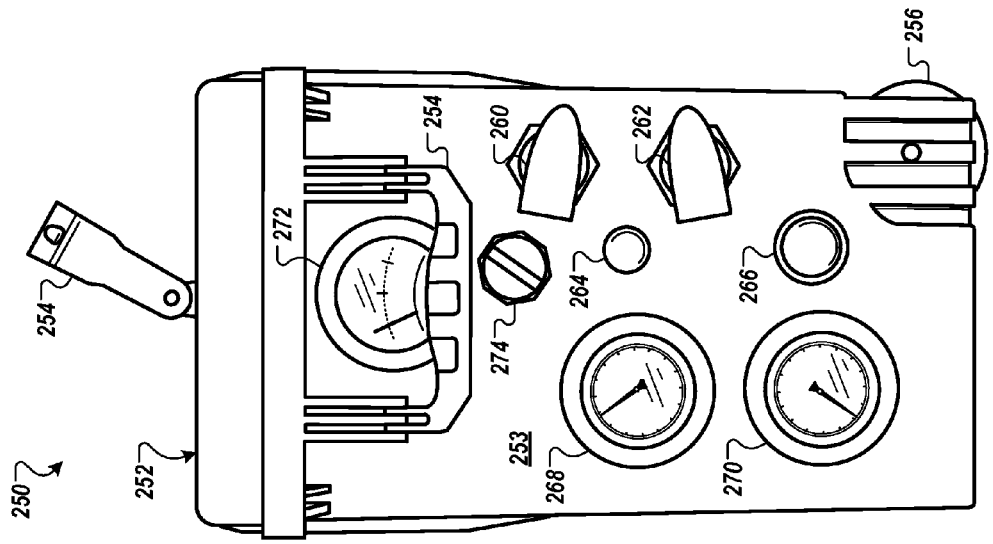
Figure 2B:
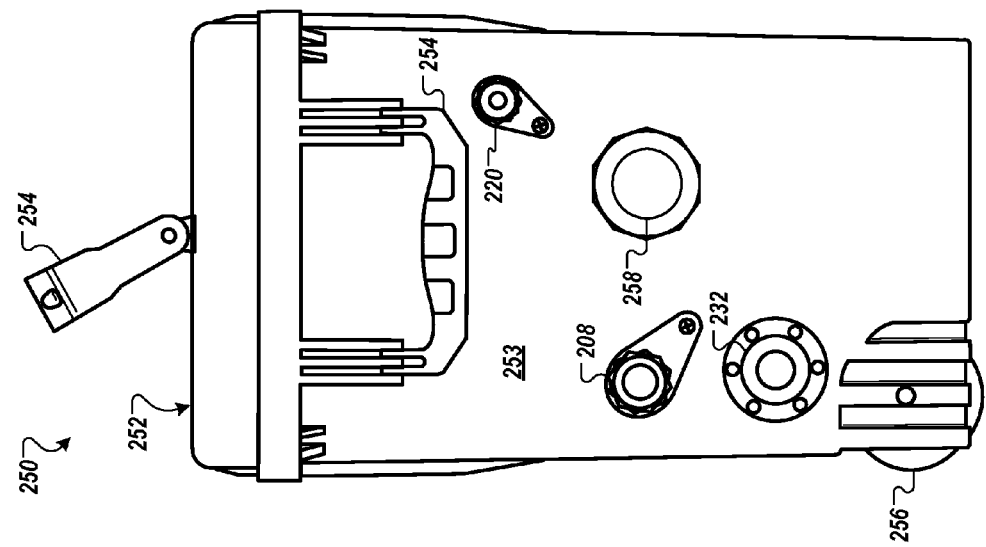

FIGS. 2A-2C are perspective, rear and front views of an apparatus 250 for facilitating use of an instrument (e.g., the instrument 104) in hazardous environments. In this example, the apparatus 250 includes a housing 252 supporting a configuration of components that are similar or related to those described above in connection with the system 100 of FIG. 1. Thus, various components carried by the housing 252 may be described with reference to a corresponding structure or device from the system 100. Some of the components carried by the housing 252 are mounted on its outer surface 253, while other components (e.g., a fluid line, a fluid-driven generator, or a power conditioner) may be located within the housing's hollow interior cavity.

In some implementations, the housing 252 is provided as an "explosion proof" enclosure. In context of the present disclosure, explosion proof means that the housing 252 is capable of containing any explosion originating within its interior and preventing sparks from within its interior from igniting vapors, gases, dust, or fibers in the surrounding environment. In some implementations, the housing 252 is a portable enclosure that can be readily transported throughout a worksite by a user. In this example, the housing 252 includes both handles 254 and wheels 256 to facilitate portable handling by a user.

As shown in FIG. 2B, the rear side of the housing 252 includes a fluid source inlet 208, a purge gas outlet 220, an exhaust vent 232, and an electrical connector 258. The fluid source inlet 208 can be fluidically coupled to an appropriate fluid source (e.g., fluid source 110) to provide a pressurized flow of fluid to the apparatus 250. For example, fluid received at the fluid source inlet 208 can be conveyed through a fluid line (e.g., fluid line 102) to a fluid-driven generator (e.g., fluid-driven generator 106) positioned within the hollow interior of the housing 252. The purge gas outlet 220 can be fluidically coupled to a purge gas inlet of an instrument designed for use in hazardous environments. For example, fluid received at the fluid source inlet 208 can be conveyed through the fluid line to the purge gas outlet 220. The exhaust vent 232 is coupled to the enclosed fluid-driven generator to discharge exhaust fluid from the housing 252. The electrical connector 258 can be electrically coupled to a mating connector of the instrument to power the instrument with electricity produced by the fluid-driven generator within the housing 252. In some implementations, the electrical connector 258 is rated for use in hazardous environments.

As shown in FIG. 2C, the front side of the housing 252 includes two actuator handles 260 and 262, two control knobs 264 and 266, and two pressure indicators 268 and 270. The actuator handle 260 is installed to operate a stop valve (e.g., stop valve 116) installed on a branch of the fluid line leading to the purge gas outlet 220. The actuator handle 262 is installed to operate a stop valve (e.g., stop valve 124) installed on a second branch of the fluid line leading to the fluid-driven generator. The actuator handles 260 and 262 can be adjusted by a user (e.g., by twisting) to operate the respective stop valves between an open- and closed-position. The control knob 264 is installed to operate a pressure regulator (e.g., pressure regulator 118) installed on the first fluid-line branch; and the control knob 266 is installed to operate a pressure regulator (e.g., pressure regulator 126) installed on the second fluid-line branch. The control knobs 264 and 266 are continuously adjustable by a user (e.g., by turning) to establish the pressure setpoint of the respective pressure regulators. The pressure indicators 268 and 270 are installed to provide pressure readings at the downstream side of the respective pressure regulators. Thus, during use, a user can adjust the control knob 264 to control the pressure regulator on the first fluid-line branch and receive feedback by reading the pressure indicator 268. Likewise, the user can adjust the control knob 266 to control the pressure regulator on the second fluid-line branch and receive feedback by reading the pressure indicator 270.

The front side of the housing 252 further includes a voltage indicator 272 and a selector switch 274. The voltage indicator 272 is installed to provide voltage readings relating to electricity flowing through the electrical connector 258. In some implementations, the voltage indicator 272 can provide voltage readings at multiple points along an electrical path. For example, the voltage indicator 272 may provide voltage readings of electricity upstream or downstream of an electrical converter (e.g., converter 138) coupled to the fluid driven generator. The selector switch 274 can be adjusted by a user to change the types of voltage readings provided by the voltage indicator 272.

Figure 3:
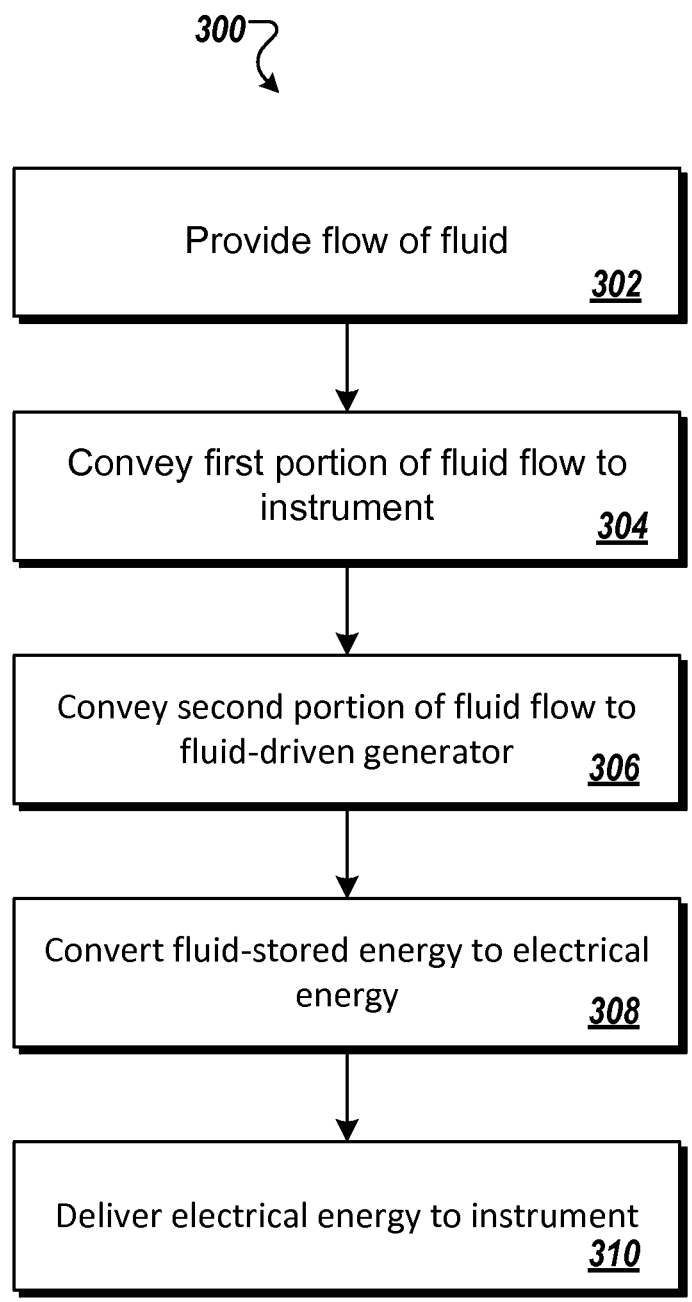
FIG. 3 is a flow chart illustrating a method of facilitating use of instruments in hazardous environments.

FIG. 3 is a flow chart illustrating a method 300 of facilitating use of instruments in hazardous environments. The method 300 can be implemented, for example, in connection with one or more components of the system 100 shown in FIG. 1 and/or the apparatus 250 shown in FIG. 2. Further, the operations of the method do not require the any particular order to achieve desirable results. In addition, other operations may be provided, or operations may be eliminated, from the described method without departing from the scope of the present disclosure.

At operation 302, a flow of fluid is provided to the fluid line. In some examples, the amount of fluid provided to the fluid line is at least a sufficient amount of fluid to satisfy a purge gas demand and a power demand of the instrument. The fluid flow can be provided from a fluid source, such as a storage tank, or from a central line continuously delivering the fluid from a compressor. In some examples, the fluid is a compressed gas suitable for use as a purge gas.

At operation 304, a first portion of the fluid flow is conveyed to the instrument. The first portion of the fluid flow can be controlled by a pressure regulator based on a purge gas demand of the instrument. In some examples, the instrument is a portable device configured for use in hazardous environments. In a particular example, the instrument is an analytical instrument designed to provide information on the composition of matter. At operation 306, a second portion of the fluid flow is conveyed to the fluid-driven generator. The second portion of the fluid flow can be controlled by a pressure regulator based on a power demand of the instrument. In some examples, the second portion of the fluid flow is controlled independently of the first portion, and vice versa. At operation 308, energy stored in the fluid is converted to a flow of electrical energy with the fluid-driven generator. In some examples, the fluid-driven generator is a turbo-alternator including a turbine wheel mechanically coupled to an electrical alternator including a permanent magnet rotor and a stator. At operation 310, the flow of electrical energy is delivered to the instrument. In some examples, the raw electrical energy provided by the fluid-driven generator is conditioned prior to its delivery to the instrument. Conditioning the flow of electrical energy can include transforming an AC flow of electricity provided by the fluid-driven generator to a direct current flow of electricity. Conditioning the flow of electrical energy may further include regulating a voltage of the direct current flow of electricity to deliver electrical energy to the instrument at a predetermined voltage.

A number of embodiments of the invention have been described. Nevertheless, it will be understood that various modifications may be made without departing from the spirit and scope of the present disclosure. For example, while the system has been described herein as including various modular components, a single integrated construction is also contemplated. It is further contemplated that the system could be scaled and modified to support multiple instruments from multiple fluid sources.

The invention claimed is:

1. An apparatus for facilitating use of instruments in hazardous environments, the apparatus comprising:
a fluid line comprising:
an inlet to receive a flow of fluid from a fluid source;
a first outlet to convey a first portion of the fluid flow to a housing of an instrument as a non-combustible purge gas pressurizing an interior of the housing; and
a second outlet to convey a second portion of the fluid flow independent of the first portion;
a fluid-driven generator coupled to the second outlet of the fluid line, the fluid-driven generator converting fluid-stored energy in the second portion of the fluid flow to electrical energy deliverable to the instrument as the second portion of the fluid flow is received from the second outlet;
first and second adjustable pressure regulators coupled to the fluid line and configured to independently control the first and second portions of the fluid flow through a range of different positive pressure set points based on respective purge gas and power demands associated with the instrument; and
a portable explosion proof housing carrying the fluid line, the fluid-driven generator, and the first and second pressure regulators; the portable housing separate from, and transportable independently of, the instrument.

2. The apparatus of claim 1, wherein the fluid-driven generator comprises a fluid-driven turbo-alternator.

3. The apparatus of claim 1, wherein the fluid source consists of a single gas source, and wherein the flow of fluid comprises a flow of compressed gas.

4. The apparatus of claim 1, wherein the first outlet of the fluid line is coupled to a purge gas inlet of the instrument, and wherein the instrument comprises a portable device for use in hazardous environments.

5. The apparatus of claim 1, further comprising a power conditioner coupling the fluid-driven generator to the instrument.

6. The apparatus of claim 5, wherein the power conditioner comprises a rectifier to transform an alternating current flow of electricity provided by the fluid-driven generator to a direct current flow of electricity.

7. The apparatus of claim 6, wherein the power conditioner further comprises a converter electrically connected to the rectifier to regulate a voltage of the direct current flow of electricity to a predetermined voltage.

8. The apparatus of claim 7, wherein the power conditioner further comprises at least one of a surge dampening device and an isolation switch electrically connected to the converter.

9. A method of facilitating use of an instrument in hazardous environments, the method comprising:
providing a flow of fluid to a fluid line carried by a portable explosion proof housing;
conveying, through a first outlet of the fluid line, a first portion of the fluid flow to a housing of an instrument as a non-combustible purge gas pressurizing an interior of the housing of the instrument, the explosion proof housing separate from, and transportable independently of, the housing of the instrument;

regulating, by adjusting a first pressure regulator carried by the explosion proof housing, a flow rate of the first portion of the fluid flow based on a purge gas demand of the instrument;

conveying, through a second outlet of the fluid line, a second portion of the fluid flow to a fluid-driven generator carried by the explosion proof housing;

regulating, by adjusting a second pressure regulator carried by the explosion proof housing, a flow rate of the second portion of the fluid flow based on a power demand of the instrument, the second pressure regulator adjustable independent of the first pressure regulator, such that the flow rate of the first portion of the fluid flow is regulated differently than the flow rate of the second portion of the fluid flow;

converting fluid-stored energy in the second portion of the fluid flow to a flow of electrical energy with the fluid-driven generator; and delivering the flow of electrical energy to the instrument.

10. The method of claim 9, wherein providing the flow of fluid comprises providing at least a sufficient amount of fluid to satisfy the purge gas demand of the instrument and the power demand of the instrument.

11. The method of claim 9, further comprising, transporting the portable explosion proof housing carrying the fluid line and the fluid-driven generator to a hazardous environment.

12. The method of claim 9, wherein providing the flow of fluid comprises providing a flow of compressed gas.

13. The method of claim 9, wherein the instrument comprises a portable device for use in hazardous environments.

14. The method of claim 9, further comprising conditioning the flow of electrical energy prior to delivering the flow of electrical energy to the instrument.

15. The method of claim 14, wherein conditioning the flow of electrical energy comprises transforming an alternating current flow of electricity provided by the fluid-driven generator to a direct current flow of electricity.

16. The method of claim 15, wherein conditioning the flow of electrical energy further comprises regulating a voltage of the direct current flow of electricity to deliver electrical energy to the instrument at a predetermined voltage.

17. A system comprising:
an explosion proof housing containing:
    a gas line comprising an inlet coupled to a gas source, first and second outlets, and
    first and second adjustable pressure regulators configured to independently control first and second flows of gas from the gas source through a range of different positive pressure set points, such that the first flow of gas is controlled differently from the second flow of gas; and
    a fluid-driven turbo-alternator coupled to receive the second flow of gas through the second outlet of the gas line, the fluid-driven turbo-alternator converting gas-stored energy in the second flow of gas to electrical energy;
the system further comprising a portable device configured for use in a hazardous environment, the portable device separate from the explosion proof housing, the portable device coupled to receive the first flow of gas from the gas source through the first outlet of the gas line as a non-combustible purge gas to pressurize an interior of the portable device and the portable device further configured to receive electrical energy from the fluid-driven turbo-alternator.

* * * * *